United States Patent [19]
Winther

[11] 3,828,149
[45] Aug. 6, 1974

[54] MECHANICALLY-RESETTING TIRE DEFLATION SIGNALLING SYSTEM

[75] Inventor: Harry C. Winther, Glen Mills, Pa.

[73] Assignees: Walter J. Winther; Charles R. Winther; William J. Winther; Shirley M. Winther, ; part interest to each

[22] Filed: Feb. 15, 1973

[21] Appl. No.: 332,775

[52] U.S. Cl. .......................... 200/61.25, 200/83 R
[51] Int. Cl. .......................................... H01h 35/00
[58] Field of Search.......... 200/61.22, 61.25, 61.41, 200/61.44, 82 R, 83 R, 83 J; 340/58; 116/34; 137/557; 73/146, 146.2, 146.3, 146.4, 146.5

[56] References Cited
UNITED STATES PATENTS
3,710,314 1/1973 Bell et al..................... 200/61.25 X FOREIGN PATENTS OR APPLICATIONS
1,030,246 3/1953 France............................ 200/61.25

*Primary Examiner*—James R. Scott
*Attorney, Agent, or Firm*—W. Wyclif Walton

[57] ABSTRACT

Apparatus including a pressure differential responsive valve for connection with the interior of a vehicle tire and an actuator responsive thereto for energizing a signalling circuit or the like on loss of tire pressure, combined with a camming device for resetting the actuator after the tire pressure has been restored to a predetermined value, together with visual signalling means carried by the vehicle wheel affording indication of deflation independently of the signalling circuit.

4 Claims, 5 Drawing Figures

PATENTED AUG 6 1974 3,828,149

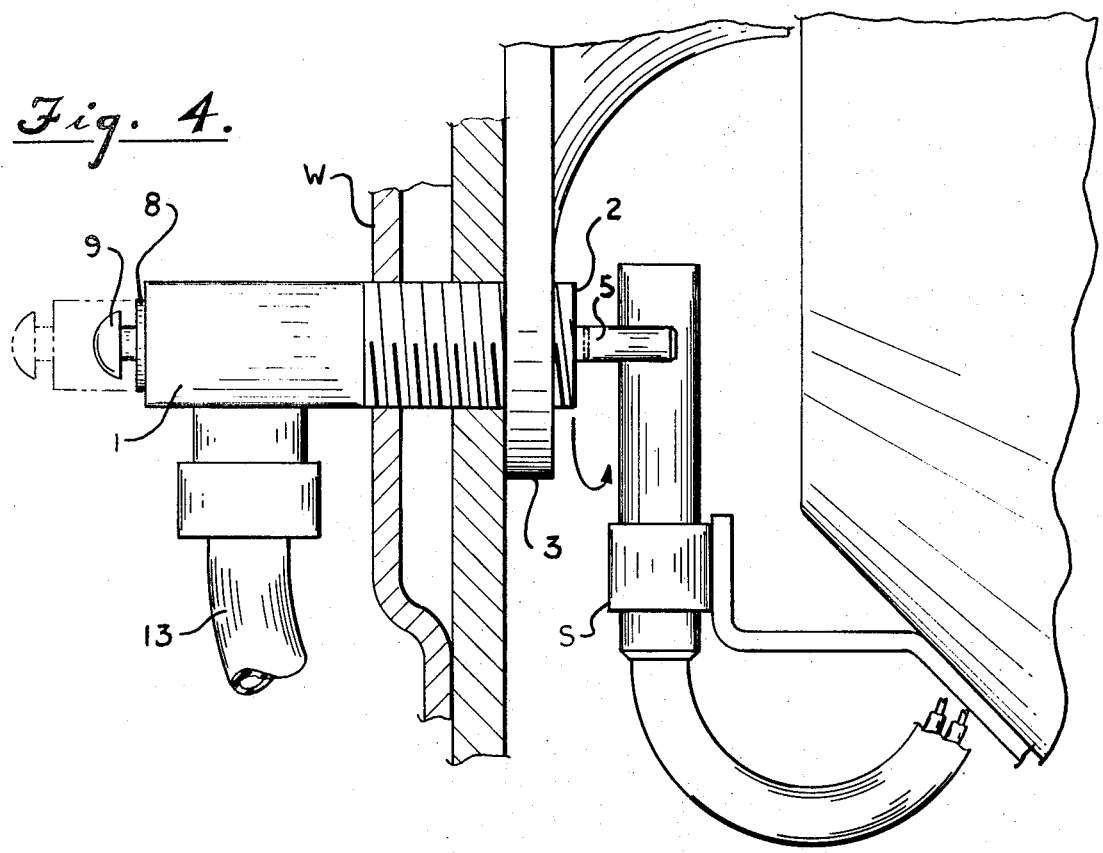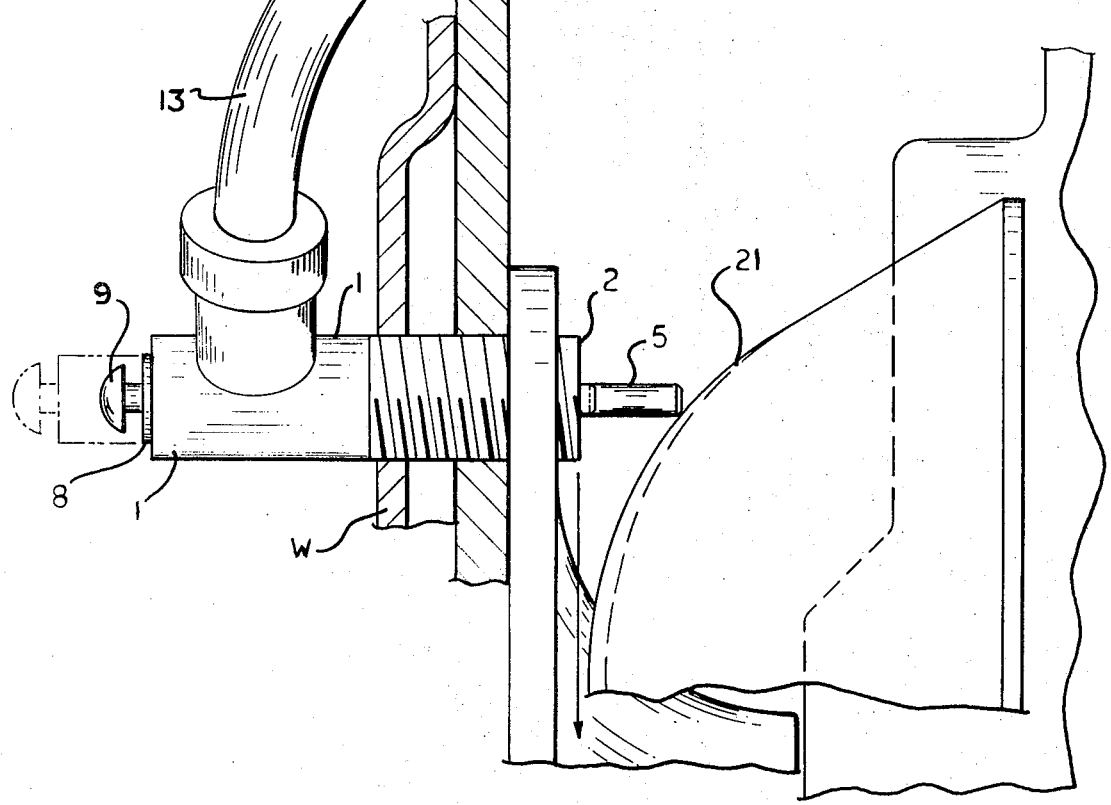

MECHANICALLY-RESETTING TIRE DEFLATION SIGNALLING SYSTEM

CROSS REFERENCE TO RELATED APPLICATION

In my copending application Ser. No. 113,566, filed Feb. 8, 1971, now U.S. letters Pat. 3,717,845, granted Feb. 20, 1973, there is described and claimed a vehicle tire deflation signalling system on which the present system is an improvement most particularly in that it embodies visual means associated with and effective independently of the electrical signalling system for indicating on casual inspection a condition of under-inflation of a tire, together with mechanical means for automatically resetting the system for normal operation after a condition of under-inflation of a tire has been corrected.

BACKGROUND OF THE INVENTION

1. Field of the Invention

Tire deflation signalling systems are useful, especially for heavy duty vehicles such as buses and trucks, to give immediate warning of hazardous conditions due to tire deflation or under-inflation since on modern high speed highways an unobserved condition of inadequate inflation may and often does result in irreparable damage to the under-inflated tire, and entails risk of accident to the vehicle when through such damage internal pressure may suddenly be wholly lost, with consequent impairment of control of the moving vehicle by the operator.

2. The Prior Art

It has usually been the practice to provide means for detecting tire under-inflation including an electrical circuit used to energize signal means giving warning of under-inflation. These have not been satisfactory and in my said prior copending application I have disclosed a system including a switch mounted on a relatively stationary part of a vehicle adapted to be actuated by a plunger carried by the vehicle wheel and disposed to be displaced into a path intersected by the switch when a condition of under-inflation of a tire occurs, actuation of the switch by the plunger completing a circuit including signalling means, which may be visual, or oral or of any other type, adequate to convey information to the operator at his station in the vehicle. Such system is normally adequate, but requires manual resetting of the switch-actuating plunger after the condition of under-inflation has been corrected and the system does not readily permit determination of the condition of the tire by visual inspection from without the vehicle, or in the event of electrical failure in the signal-activating circuit.

SUMMARY OF THE INVENTION

The present invention comprehends an improvement on that disclosed in said prior copending application in one of its embodiments, primarily in that it includes means facilitating under-inflation detection with system resetting means whereby when the system has been activated to indicate a condition of under-inflation in a tire and that condition has been corrected, as by reinflating the tire either before or after its repair or replacement, the system is automatically restored to its original state and thus in readiness to give indication in normal fashion of a recurrence of the under-inflation.

BRIEF DESCRIPTION OF THE DRAWING

In the accompanying drawing

FIG. 4 is a fragmentary enlarged detail of FIG. 1 showing in full lines the switch actuating element embodied in the apparatus extended as a result of loss of pressure in the associated tire, and about to actuate the switch to cause such loss of pressure to be indicated to the vehicle operator and FIG. 5 is a fragmentary enlarged detail of FIG. 1 showing said switch actuating element extended and about to engage a resetting cam for restoring it to normal condition, as after a pressure loss has been corrected.

DESCRIPTION OF THE PREFERRED EMBODIMENT

Figure 1:
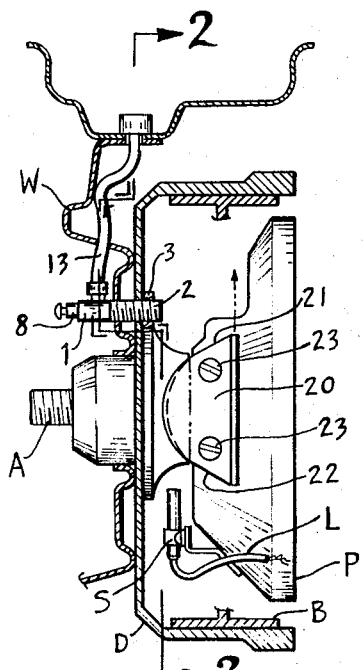
FIG. 1 is a fragmentary axial section through a vehicle wheel and associated chassis parts showing the signal controlling switch of a tire deflation signalling system and actuating means therefor mounted in the wheel and embodying the present invention.
Figure 2:
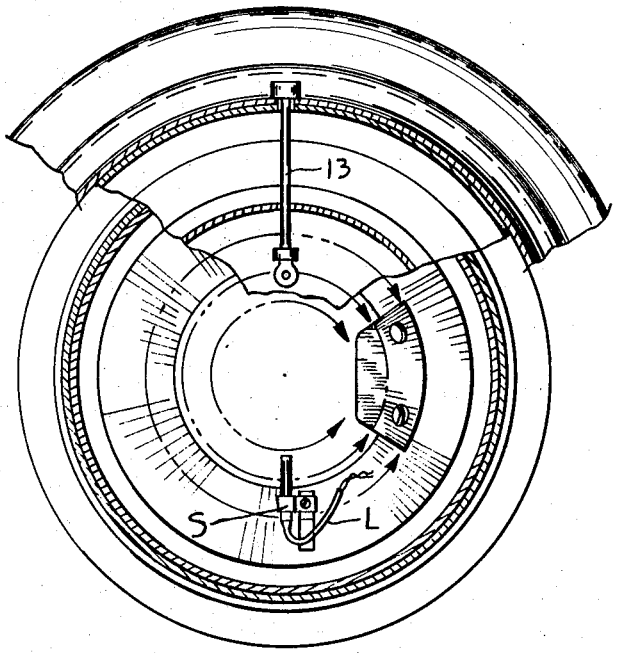
FIG. 2 is a fragmentary elevation thereof in the direction of the wheel axis, partly in vertical section on line 2—2 in FIG. 1.

In the drawing the vehicle wheel W, which normally carries a pneumatic tire (not shown), is mounted for rotation with or about an axle A and in accordance with usual practice may carry a brake drum D, engageable by a brake shoe B mounted on a chassis part P which is stationary with relation to the wheel and carries an electrical switch S in circuit through conductor L and the chassis part P with signalling means (not shown). The latter may in general be comparable to the signalling means described in my said prior copending application, or any other suitable electrically energizable signalling means as preferred.

In accordance with the present invention there is mounted on wheel W a pressure-differential-responsive unit comprising a housing 1, preferably generally cylindrical and provided with external threads for engagement with complementary threads in the wheel and secured therein as by a lock nut 3. Housing 1 contains a perforated transverse partition 4 in which is slidably mounted a plunger 5 carrying an annular washer 6 fixed to the plunger and with partition 4 embracing a coil spring 7 biasing the plunger toward the right in FIG. 3. Plunger 5 is normally held retracted in housing 1 against the bias of spring 7 by a piston 8 carried by the outer end of the plunger and presenting a resetting handle 9 whereby it may be manually retracted after it has been activated in a manner hereinafter described.

Housing 1 carries a radially projecting threaded nipple 10 on which is mounted a cap 11 in turn having smaller axial nipple 12 receiving a flexible conduit 13 or other suitable connection through which communication with the interior of the tire on wheel W may be maintained, in the embodiment shown the conduit extending through the wheel rim for communication with the tire and having an appropriate sealing connection to the rim. Disposed within nipple 10 and having an axial stem extending into housing 1 is a poppet 15 biased outwardly from the housing by a coil spring 16, with its head engaging a flexible diaphragm 18 sealed to the end of nipple 10 by cap 11 whereby pressure of air from the tire, acting through conduit 13 against diaphragm 18, normally maintains the valve poppet depressed against the bias of spring 16 and thus with its stem extending into housing 1 to maintain plunger 5 retracted against the bias of spring 7 through its engagement with piston 8.

Figure 3:
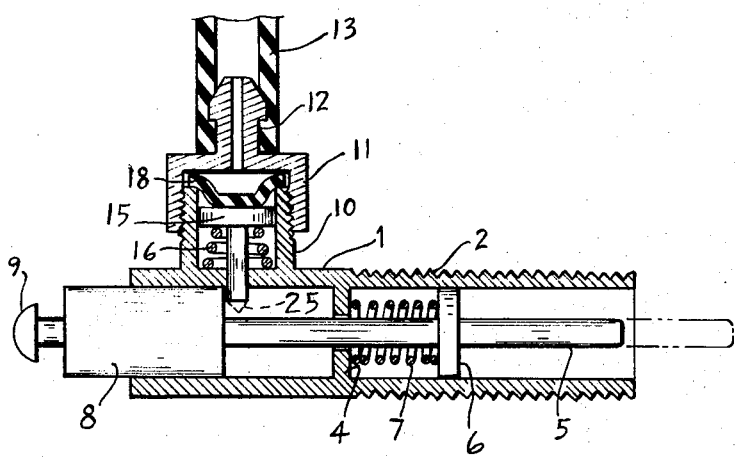
FIG. 3 is an enlarged axial section, partly in elevation, showing the pressure-differential-responsive switch-actuating means contemplated by this invention.

Mounted on chassis part P in the path of plunger 5 when it has been projected to the broken line position indicated in FIG. 3 is a resetting cam 20 having angular side faces 21,22 and secured to the chassis part, as by screws 23, whereby on rotation of the wheel in either direction carrying projected plunger 5 into engagement with cam 20, the plunger is depressed by the corresponding cam face 21 or 22 as the case may be, causing piston 8 to be retracted to a position allowing the stem of poppet valve to reengage its front face and thereafter hold the plunger retracted.

Assuming that the apparatus constructed as described and associated with a wheel W carrying a pneumatic vehicle tire inflated to at least its normal internal pressure, the pressure, communicating through conduit 13 with the diaphragm chamber in cap 11, holds diaphragm 18 and hence poppet 15 depressed against the bias of spring 16. Plunger 5, retracted against the bias of spring 7, is normally held in that position through the engagement of the stem of poppet 15 with the face of piston 8. However, when the pressure in the tire decreases to an undesirable value, such as to allow the bias of spring 16 against poppet 15 to overcome it and retract the poppet from engagement with piston 8, plunger 5 is thereupon projected outwardly by the bias of spring 7 to its broken line position (FIG. 3). Upon ensuing rotation of the wheel, whether or not the vehicle is in motion at the time the plunger is projected, the plunger engages and activates switch S to energize the electrical signalling system and warn the operator of the condition of the tire. Simultaneously with projection of plunger 5 into a path for engagement with switch S, piston 8, carrying reset handle 9, is drawn into housing 1 so that mere casual inspection discloses to an informed observer that the condition of the tire is abnormal.

On correction of the said abnormal condition of the tire full pressure against diaphragm 18 is restored sufficient to overcome the bias of spring 16, but as restoration of poppet 15 is now blocked by piston 8 it is necessary that plunger 5 be retracted to reset the apparatus. The resetting operation can be effected manually by use of resetting handle 9, but as the resetting is often, if not usually, overlooked, necessity for it is eliminated through provision of resetting cam 20 which on rotation of wheel W carrying housing 1 past the cam on each revolution, slides the plunger toward reset position until the end of the stem of poppet 15 can engage the front face of piston 8 to hold the plunger retracted. If desired, to facilitate the automatic resetting of the plunger, the end of the poppet stem may be beveled or chamfered as at 25 (FIG. 3).

I claim:

1. In a vehicle tire deflation signalling system comprising and electrical circuit adapted to energize a signal and a switch with an activator arm in the circuit controlling the signal and mounted on the vehicle chassis, a substantially cylindrical housing carried by a wheel of the vehicle, a plunger in the housing adapted to be projected therefrom into a path intersected by said switch activator arm, yielding means for projecting said plunger into said path, a detent for restraining said plunger in a position retracted from said path, and a pressure-differential-responsive valve operatively communicating with the interior of the tire and adapted to retract said detent to release said plunger for projection into said path to activate said switch in response to dimunution of pressure in the tire to less than a predetermined value.

2. Apparatus as defined in claim 1 including means presenting camming surfaces carried by said vehicle chassis and projecting into said path intersected by said switch activator arm, operative when engaged by said plunger after it has been projected from said housing to return said plunger toward said housing for retention therein by said detent when pressure in said tire has been restored to a normal value.

3. Apparatus as defined in claim 1 in which said plunger carries a piston normally projecting from the housing in the direction oppositely from said path slideable into said housing when said plunger is released by said detent.

4. Mechanically resetting tire deflation signalling system apparatus comprising tire-pressure-differential responsive means, mechanical sensor means coupled to said pressure-differential-responsive means carried by a moving structure movable relatively to said structure into a path abnormal with respect to said structure, a relatively stationary signal-activating element interposed in said path for actuation by said mechanical sensor means when in said abnormal path, and yielding means for projecting said mechanical sensor means into said abnormal path in response to pressure-differential actuation of said pressure-differential-responsive means, said mechanical sensor means movable into said abnormal path comprising a spring-biased plunger and said pressure-differential-responsive means including a detent engageable with said plunger operative when in engagement therewith to restrain its movement in response to the bias of its spring.

* * * * *